Jan. 9, 1962

J. P. KEARNS 3,015,948

FLUTTER SIMULATOR

Filed May 18, 1960

JOHN P. KEARNS
INVENTOR

BY W. O. Dusenberry
Claude Funkhouser
ATTORNEYS

Jan. 9, 1962 J. P. KEARNS 3,015,948
FLUTTER SIMULATOR
Filed May 18, 1960 2 Sheets-Sheet 2

INVENTOR
JOHN P. KEARNS

BY
ATTORNEYS

United States Patent Office 3,015,948
Patented Jan. 9, 1962

3,015,948
FLUTTER SIMULATOR
John P. Kearns, Hyattsville, Md., assignor to the United States of America as represented by the Secretary of the Navy
Filed May 18, 1960, Ser. No. 30,039
4 Claims. (Cl. 73—67.2)

The present invention relates to vibration testing devices and more particularly to such a device for producing self-excited vibrations to simulate flutter in aerodynamic surfaces.

Flutter in aircraft or missile structures is unwanted and ranges in its undesirability from being a mild nuisance, as in the case of sustained annoying vibrations, to a castastrophic phenomenon where divergent and destructive vibrations are produced. This problem of self-excited vibrations involves the interaction of aerodynamic, stiffness and inertia forces on a structure in such a way that a continuous sinusoidal oscillation is possible at a critical flight speed. When such a condition exists, a small increase in speed is then often sufficient to produce the disastrous effects of the divergent vibrations.

In attempting to establish the flutter characteristics of a given configuration, it is extremely desirable to have an intelligent intermediate step between engineering analysis and flight testing since such an intermediate test can improve the estimates. Various ground tests to establish the stiffnesses and modes of a system in the absence of aerodynamic forces may be used to supplement the analytical process of flutter evaluation. Wind tunnel flutter models are also employed to develop a fuller understanding of aerodynamic forces interacting with a dynamical system which is intended to represent the real structure as closely as possible.

All these intermediate steps involve a determination of significant structural unknowns which do not emerge clearly from conventional vibration test practices. These unknowns, or elements, when used with computed air force coefficients lead to better estimates of the flutter speed of the aerodynamic surface. The process is indirect and lends itself to errors in interpretation of the vibration test data, particularly when reasonable agreement between the theoretical and experimental modes and frequencies has not been established.

It is therefore desirable to develop a more direct technique for rapid flutter speed determination. The present invention is considered to be a first approximation to the technique and aims to create by employing a closed loop or feedback system, a self-excited vibration on the ground which would be the same as one to be encountered in flight. The gains in the closed loop ground system are set at levels corresponding to the aerodynamic coefficients which apply to flight at a chosen Mach number and altitude. If the closed loop system produces a self-excited oscillation, then the direct prediction is that flutter would occur at the chosen Mach number and altitude.

In one embodiment of the present invention, a single shaker is used to represent the distributed aerodynamic forces acting on a surface, and while the desired self-excited vibration is not fully created, the results obtained are extremely valuable. In certain cases of practical interest which involve the bending torsion flutter of a tail-heavy surface having natural frequencies close together, the one-shaker approximation bears great promise as a supplement to conventional vibration test techniques. The simplified aerodynamics employed in this embodiment yielded analytical flutter speeds of certain two-dimensional flapping and rotation type problems to within 10% of the analytical flutter speeds determined by the NACA by the use of complex aerodynamics. It can be concluded, therefore, that the chosen simplification is a reasonable first approximation to be used in conjunction with the present invention.

A more complex embodiment of the present invention contemplates the use of a plurality of shakers and pickups at a number of stations along the span of the aerodynamic surface. As will be seen, a comparatively simple procedure is employed for various Mach numbers to provide a more complete analysis of the flutter characteristics of the structure under test.

Other advantages of the present invention will be readily appreciated as the same becomes better understood by reference to the following detailed description when considered in connection with the accompanying drawings.

Briefly, the present invention contemplates a vibrating means and a feedback system including means for producing a voltage in phase with the angular motion at a chosen station, and an amplifier for converting this voltage into a voice coil current and hence a shaker force. An adjustment of gain in such a system corresponds to an increase in shaker force per unit of surface angular motion; and for a dynamically tail-heavy system, a gain will be reached at which self-excitation is initiated, and the surface will vibrate in a simulated flutter mode.

Figure 1:
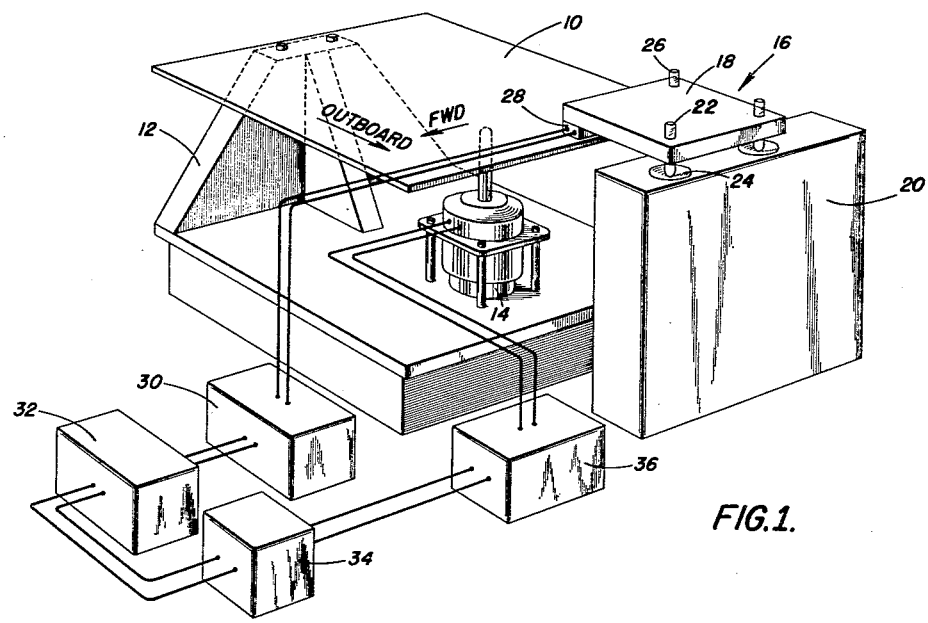
FIG. 1 is a perspective of one embodiment of the present invention utilizing a single shaker and a single pickup.

Referring now to the drawing in detail, FIG. 1 depicts an embodiment of the present invention in one of its simplest forms and shows a plate 10, representing an aerodynamic surface, clamped at one edge to a support 12. A vibrator or shaker 14 is positioned under the plate 10 at a mid-chord point between three-fourths and full span, the direction of span being normal to the line of the clamped edge and the chord line being parallel thereto. The point selected for the position of the shaker 14 represents the location where, in the concept described above, the distributed air pressures are replaced by a single concentrated force.

For the purpose of measuring the angular deflection of the plate 10 as it acts under the influence of the shaker 14, an angular displacement transducer 16 is coupled to the plate and includes a door 18 which pivots on a base 20. The door 18 is preferably constructed of light material such as balsa wood and is provided with a thin shell such as might be furnished by a wrapping of aluminum foil. The resulting structure is not only lightweight, but also is one which possesses a high natural frequency. The pivoting edge of the door 18 contacts the base 20 through a pair of glass rods 22 so positioned that the pivotal axis is parallel with the chord of the plate 10. Secured to the base is a pair of glass seats 24 for receiving the rods in order to prevent lateral motion thereof. The opposite edge of the door 18 contacts the plate 10 through a single glass rod 26 which also bears in a glass seat that is secured to the plate. For the purpose of providing a degree of stability, a light spring (not shown) is attached to the underside of the door 18 and anchored to the base 20 to produce a small downward force on the door. It will be seen that with the door 18 supported in this three point contact arrangement, any pitching motion of the plate 10 will produce a variation in the air gap between the unsupported corner of the door 18 and the plate. For the purpose of sensing this variation, a capacitance pickup 28 is mounted on the underside of the unsupported corner of the door. The pickup 28 is positioned in such a manner that the line between the center of the effective face of the pickup and the rod 28 is parallel with the chord line of the plate 10. Also, the spanwise distance between the center of the effective face and the forward rod of the pair 22 should be equal to the distance between the rod 26 and the aft rod of the pair 22 in order to obtain as high a degree of accuracy as possible.

Associated with the pickup 28 is an oscillator 30 which produces a voltage varying in strength proportional to the change in capacitance due to the varying air gap as sensed by the pickup. For the purpose of amplifying the voltage from the oscillator 30, an amplifier 32 having low frequency and low noise characteristics is utilized. This amplifier is then coupled through a potentiometer 34 to a power amplifier 36 which produces an amplified current in phase with the input voltage.

The signal from the current amplifier 36 is then fed to the shaker 14 to produce excitation of the plate 10. As established previously, the resulting shaker force must be 180 degrees out of phase with the angle of the plate 10; that is, when the plate assumes a nose up attitude, the shaker force must also be in an upward direction. If it is observed that this condition does not exist, but that the force and angle are in phase, then a mere reversal of the shaker leads will produce the proper phase relationship.

Self-oscillation of the plate 10 is attained as the ratio of shaker force to angular displacement is increased to a critical value. The shaker force P acting at any time may be found from the appropriate shaker calibration factor and a measurement of the shaker current. Determination of the angular displacement is accomplished by measuring the oscillator voltage and converting its value into radians by use of a transducer calibration factor. This latter factor is obtained from a static test in which a series of feeler gages is inserted in between the aft rod 26 and the base 10. The voltage values are then measured and inserted into the following:

$$\text{Calibration factor } C = \frac{e_p l}{d_0}$$

where $e_p$ = voltage output of the oscillator from the capacitance pickup
$l$ = distance between aft rod end and center of effective face of the pickup
$d_0$ = feeler gage thickness If this ratio or gain, as determined from measurements of the shaker force and angular displacement, is converted to an equivalent value as determined by the flutter mode shape, a comparison thereof with the highest value of calculated aerodynamic force per unit angle to be expected in flight gives an indication as to whether or not a flutter condition is present. That is, if the critical measured gain is less than the calculated flight value, a flutter condition is indicated.

The quantities to be compared can also be expressed in terms of generalized shaker input force $Q_s$ and generalized aerodynamic force $Q_a$. The former may be expressed as $$Q_s = P_s h$$

where
$P_s$ is the amplitude of the oscillating force, and
$h$ is the displacement at the selected point.

In computing the generalized aerodynamic force $Q_a$, the surface is considered as undergoing the same displacements at some chosen Mach number:

$$Q_a = C_{L\alpha} q \int_0^L h \alpha c \, dy$$

where $C_{L\alpha}$ is the supersonic lift coefficient
$q$ is the dynamic pressure
$L$ is the span
$h$ is the displacement
$\alpha$ is the angle of twist
$c$ is the total chord at a given station.

If the centers of pressure lie along the mid-chord line, and the leading and trailing edge displacements have been measured, the above expression for $Q_a$ becomes:

$$Q_a = C_{L\alpha} q \int_0^L \left(\frac{h_r^2 - h_f^2}{2}\right) dy$$

where
$h_r$ is the trailing edge displacement and
$h_f$ is the leading edge displacement.

If the generalized shaker force $Q_s$ is less than the generalized aerodynamic force $Q_a$, a condition of flutter can be expected at the chosen Mach number.

Figure 2:
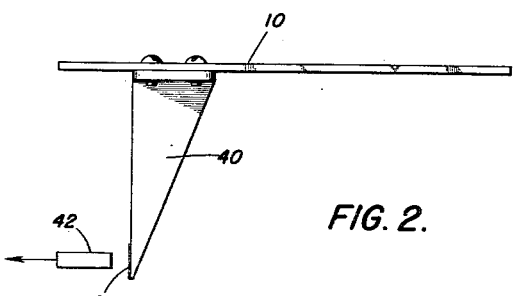
FIG. 2 is an elevation of an alternate method of sensing angular deflection of the surface under test.

FIG. 2 shows an alternate method of detecting the angle of pitch of the plate 10 which, while not as effective as the door arrangement 18 depicted in FIG. 1, may be used with a few restrictions. A pylon 40 made preferably of balsa wood is bolted or otherwise suitably fastened to the underside of the plate 10 and extends in a downward direction. Secured to the point of the pylon 40 is a metal plate 41 which faces a capacitance pickup 42 that is independently mounted in spaced relationship thereto to form an air gap therebetween. When the plate 10 translates vertically, the pickup 42 senses no change in the gap; however, when the plate 10 pitches, the fore and aft motion of the plate 41 varies the gap which affects the capacitance to produce a voltage that may be easily translated into an angular deflection. The main restriction of the pylon 40 is that it cannot be used where there is any fore and aft motion of the surface under test.

Figure 3:
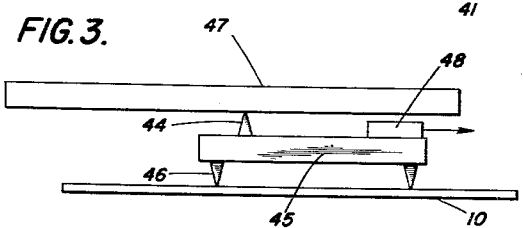
FIG. 3 is an elevation of another alternate method of sensing angular deflection.

Shown in FIG. 3 is another method for measuring angular displacement of the plate 10. While this third method is very sensitive, the low frequency pitching mode at times induces an extraneous instability in the feedback loop. In this arrangement, a beam 47 is balanced on a knife edge 44 which is affixed to a platform 45. The platform is then placed on the plate 10, contact being made through legs 46. Secured to the platform and spaced apart from the knife edge 44 is a capacitance pickup 48 which is also maintained in spaced relationship to the underside of the beam 47 in its balanced position. Thus any pitching of the plate 10 causes a variation in the air gap between the pickup 48 and the beam 47 which can be sensed by capacitance change.

Figure 4:
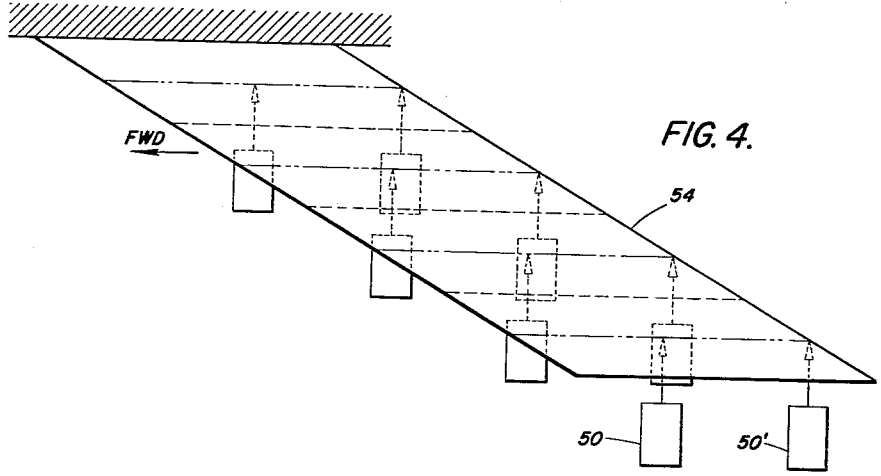
FIG. 4 is a diagrammatic representation of an aerodynamic surface having a plurality of shakers acting thereon in accordance with a more complex embodiment of the present invention.
Figure 5:
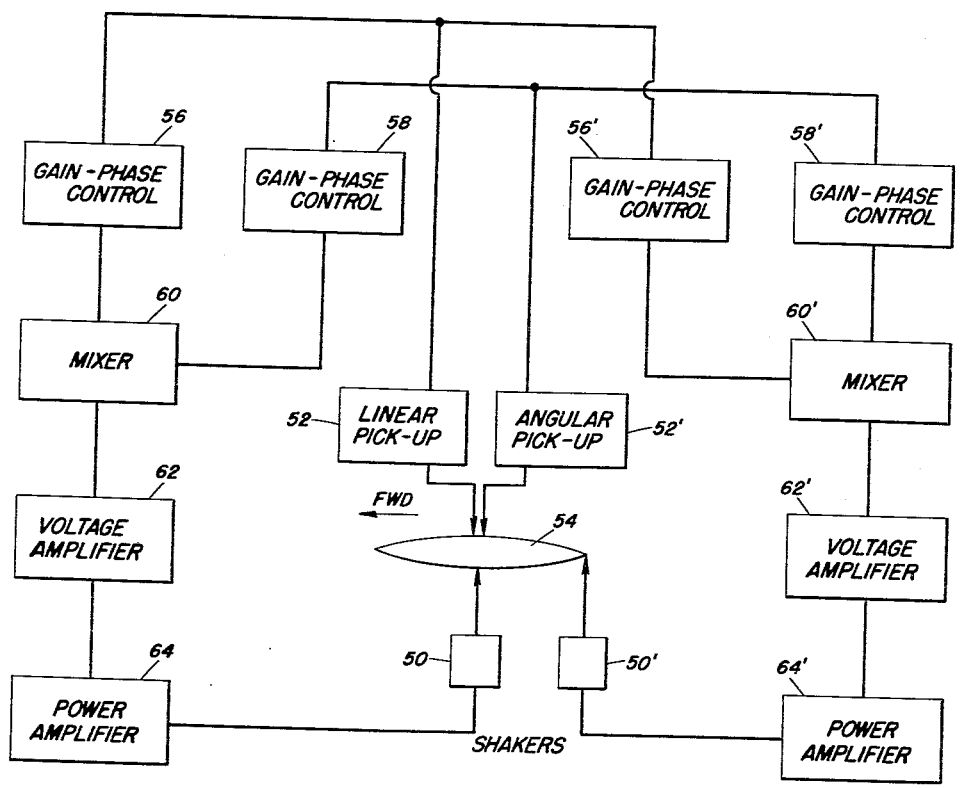
FIG. 5 is a block diagram of the complex embodiment of the flutter simulator of the present invention.

The flutter simulator of the present invention can be made progressively more complex by the use of more shakers and pickups as shown in FIGS. 4 and 5. Where these devices are best placed depends upon the nature of the structure. For example, when no chordwise bending is present in the elementary modes, a linear and an angular pickup may be placed at the mid-chord point of a plurality of spanwise stations, and two shakers may be attached, one at mid-chord, and one at the trailing edge.

In classical flutter analysis of such a problem, the displacement and rotation at each of the sections would give rise to forces and moments acting at a reference point, for example, the mid-chord. It has been observed that the force and moment may be replaced by two forces acting individually at the mid-chord and at the trailing edge, these two forces being linearly dependent upon the mid-chord linear and angular displacements. Therefore it can be concluded that the forces at each of the two points are related to linear combinations of the linear and angular displacements at the mid-chord.

FIG. 4 shows an aerodynamic surface 54 clamped at one edge with shakers 50 and 50' acting thereon at a plurality of stations.

In FIG. 5 is shown the arrangement for one station of the aerodynamic surface 54. The shakers 50 and 50' are applied at the underside of the surface 54 at mid-chord and at the trailing edge, respectively, with pickups 52 and 52' immediately thereabove. Associated in parallel relationship with the pickup 52 is a pair of gain and phase controls 56 and 56', a second pair 58 and 58' being coupled in the same manner to pickup 52'. The signals from gain and phase controls 56 and 58 are fed into a mixer 60 which is connected to a voltage amplifier 62. In order to provide a voice coil current to the shaker 50, a power amplifier 64 is used which, like the amplifier 36 of the embodiment of FIG. 1, functions without a resulting phase shift.

Similarly the signals from the gain and phase controls 56' and 58' are supplied to a mixer 60', then to a voltage amplifier 62', a power amplifier 64' and to the shaker 50' to complete the loop. In this manner, the shakers 50 and 50' are powered to oscillate the surface 54, the pickups 52 and 52' sensing the linear and angular displacements, respectively.

The coefficients by which the linear and angular displacements are multiplied to obtain the forces are functions of both Mach number and frequency. In utilizing the simulator, therefore, a Mach number and a series of frequencies must be selected for investigation. Since phase and gain terms are included in the coefficients, they can be determined when the Mach number and frequencies are chosen. The phase and gain controls 56, 56', 58 and 58' shown in FIG. 5 are set such that the force developed by each shaker is the proper linear combination of the linear and angular displacements. The network is then closed and if the system vibrates, a flutter condition is indicated. However, it may develop that the frequency of the oscillation turns out not to be the frequency which was assumed for the coefficients selected. In this event, the frequency should be measured and a new set of coefficients determined. Then the phase and gain controls are reset, and the structure observed for a condition of self-excitation. The process should converge.

If at first the structure does not oscillate, the overall gains may be increased, with the phases remaining constant. In this case, the gain at which self-oscillation occurs may be taken to be a factor of safety. In a complete flutter analysis of the surface, this procedure, just described, should be followed for the various Mach numbers which are expected to be attained in flight.

Obviously many modifications and variations of the present invention are possible in the light of the above teachings. It is therefore to be understood that within the scope of the appended claims, the invention may be practiced otherwise than as specifically described.

What is claimed is:

1. A flutter simulator for producing self-excited oscillations in a structure having spanwise and chordwise axes, comprising, means for vibrating said structure to produce a deflection about its spanwise axis, and a feedback system coupled to said vibrating means and including means for producing a vibrating force 180 degrees out of phase with the angle of said deflection, said last mentioned means including means, including an air gap and a capacitance pickup arrangement, for obtaining measurements of said deflection of said structure, means connected with said arrangement, including an oscillator, for translating each of said measurements into an electrical signal, means for amplifying and varying the strength of said signal, and means for amplifying the power of said signal to produce an amplified current in phase with said signal.

2. The apparatus as recited in claim 1 wherein said air gap and capacitance pickup arrangement for obtaining measurements of said deflection of said structure includes a base, a plate pivotally coupled thereto, a contact member on said plate and bearing on said structure to support said plate in spaced relationship thereto and to form an air gap, the width of said air gap varying as said structure deflects about its spanwise axis, and capacitance pickup means on said plate for measuring the variations in said air gap, said pickup being connected with said oscillator for transforming said measurements into an electrical signal.

3. The apparatus as recited in claim 1 wherein said air gap and capacitance pickup arrangement for obtaining measurements of said deflection of said structure includes a pylon secured to said structure, said pylon having a metal plate thereon, and a capacitance pickup in spaced relationship to said plate and forming an air gap therebetween, whereby variations in the air gap occurring as a result of said deflections are sensed by said pickup.

4. The apparatus as recited in claim 1 wherein said air gap and capacitance pickup arrangement for obtaining measurements of said deflection of said structure includes a platform mounted on said structure, said platform having a knife edge thereon, a capacitance pickup on said platform and spaced apart from said knife edge, a beam balanced on said knife edge, the end of said beam forming an air gap with said pickup when said beam is in a balanced position.

References Cited in the file of this patent

UNITED STATES PATENTS

| | | |
|---|---|---|
| 2,305,268 | Minor et al. | Dec. 15, 1942 |
| 2,361,071 | Vang | Oct. 24, 1944 |
| 2,362,467 | Clark | Nov. 14, 1944 |
| 2,448,698 | Biot et al. | Sept. 7, 1948 |
| 2,950,619 | Schuerch | Aug. 30, 1960 |